United States Patent
Kioschis et al.

(10) Patent No.: US 10,714,848 B2
(45) Date of Patent: Jul. 14, 2020

(54) ELECTRICAL HIGH-CURRENT CONNECTOR AND METHOD FOR PRODUCING AN ELECTRICAL HIGH-CURRENT CONNECTOR

(71) Applicant: TE Connectivity Germany GmbH, Bensheim (DE)

(72) Inventors: Kai Kioschis, Landau (DE); Andre Martin Dressel, Lampertheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 16/007,281

(22) Filed: Jun. 13, 2018

(65) Prior Publication Data
US 2018/0358721 A1   Dec. 13, 2018

(30) Foreign Application Priority Data
Jun. 13, 2017   (DE) .................. 10 2017 112 947

(51) Int. Cl.

| | |
|---|---|
| *H01R 11/12* | (2006.01) |
| *H01M 2/20* | (2006.01) |
| *H01R 43/02* | (2006.01) |
| *H01R 13/02* | (2006.01) |
| *H01B 9/00* | (2006.01) |
| *H01R 4/70* | (2006.01) |
| *H01R 43/00* | (2006.01) |
| *H01R 11/28* | (2006.01) |

(52) U.S. Cl.
CPC ............ *H01R 11/12* (2013.01); *H01B 9/006* (2013.01); *H01M 2/206* (2013.01); *H01R 4/70* (2013.01); *H01R 13/025* (2013.01); *H01R 43/00* (2013.01); *H01R 43/0207* (2013.01); *H01R 11/288* (2013.01)

(58) Field of Classification Search
CPC .... H01R 4/023; H01R 43/02; H01R 43/0207; H01R 43/0214; H01R 43/0221; H01R 4/029; H01R 4/08; H01B 7/009
See application file for complete search history.

(56) References Cited

U.S. PATENT DOCUMENTS

| | | | | |
|---|---|---|---|---|
| 1,751,405 | A | * | 3/1930 | Herman ................. H01R 11/12 439/883 |
| 3,648,014 | A | * | 3/1972 | Bennett ................. B23K 11/20 219/118 |
| 3,656,092 | A | * | 4/1972 | Swengel, Sr. ......... H01R 4/029 439/730 |
| 3,706,955 | A | * | 12/1972 | Bunnell ............... H01B 7/0009 439/512 |

(Continued)

FOREIGN PATENT DOCUMENTS

| | | |
|---|---|---|
| JP | 08306417 A | 11/1996 |
| JP | 2008041330 A | 2/2008 |

OTHER PUBLICATIONS

Abstract of JP2008041330, dated Feb. 21, 2008, 1 page.
Abstract JP08306417, dated Nov. 22, 1996, 1 page.

*Primary Examiner* — Ross N Gushi
(74) *Attorney, Agent, or Firm* — Barley Snyder

(57) ABSTRACT

A high-current electrical connector comprises a stranded wire and a connecting piece. The stranded wire has a longitudinal end section. The longitudinal end section of the stranded wire is incorporated in a material of the connecting piece.

10 Claims, 2 Drawing Sheets

(56) References Cited

U.S. PATENT DOCUMENTS

| | | | | |
|---|---|---|---|---|
| 4,799,899 A * | 1/1989 | Endo | ............... | H01R 43/05 |
| | | | | 29/861 |
| 4,922,072 A * | 5/1990 | Topel | ............... | B23K 11/002 |
| | | | | 219/56.1 |
| 5,191,710 A * | 3/1993 | Fujimaki | ............... | H01R 11/12 |
| | | | | 174/15.7 |
| 5,541,380 A * | 7/1996 | Ogden | ............... | H01R 11/12 |
| | | | | 219/56 |
| 5,973,287 A * | 10/1999 | Takano | ............... | B23K 11/24 |
| | | | | 219/56 |
| 5,977,508 A * | 11/1999 | Takano | ............... | B23K 11/0026 |
| | | | | 219/109 |
| 6,273,322 B1 * | 8/2001 | Yamamoto | ............... | B23K 20/10 |
| | | | | 228/110.1 |
| 6,393,924 B1 * | 5/2002 | Eder | ............... | B23K 20/10 |
| | | | | 73/850 |
| 6,452,101 B1 * | 9/2002 | Haramaki | ............... | B23K 11/115 |
| | | | | 174/74 R |
| 6,538,203 B1 * | 3/2003 | Nolle | ............... | H01R 4/62 |
| | | | | 174/84 C |
| 6,986,288 B2 * | 1/2006 | Ichikawa | ............... | G01N 3/00 |
| | | | | 73/850 |
| 7,413,488 B2 * | 8/2008 | Matsumura | ............... | H01H 85/044 |
| | | | | 439/874 |
| 7,705,265 B2 * | 4/2010 | Asakura | ............... | H01R 43/0221 |
| | | | | 219/121.64 |
| 8,627,996 B2 * | 1/2014 | Patrikios | ............... | H01R 4/029 |
| | | | | 228/110.1 |
| 8,759,679 B2 * | 6/2014 | Yoshida | ............... | H01R 43/0221 |
| | | | | 174/84 R |
| 8,921,696 B2 * | 12/2014 | Otsuka | ............... | H01R 4/021 |
| | | | | 174/74 R |
| 8,931,685 B2 * | 1/2015 | Kataoka | ............... | H01R 4/021 |
| | | | | 228/110.1 |
| 9,159,474 B2 * | 10/2015 | Ito | ............... | H01R 4/021 |
| 9,368,953 B2 * | 6/2016 | Mori | ............... | H01R 13/025 |
| 9,505,083 B2 * | 11/2016 | Ruhl | ............... | B23K 20/2333 |
| 9,550,252 B2 * | 1/2017 | Takayashiki | ............... | H01R 4/023 |
| 9,590,324 B2 * | 3/2017 | Koda | ............... | H01R 11/12 |
| 9,649,717 B2 * | 5/2017 | Ananthanarayanan | ............... | B23K 11/185 |
| 9,728,927 B2 * | 8/2017 | Kovacs | ............... | H01R 9/032 |
| 9,787,047 B2 * | 10/2017 | Mori | ............... | G01K 7/02 |
| 9,793,625 B2 * | 10/2017 | Warashina | ............... | H01R 11/12 |
| 9,793,626 B2 * | 10/2017 | Koda | ............... | H02G 1/14 |
| 9,937,583 B2 * | 4/2018 | Ananthanarayanan | ............... | B23K 11/185 |
| 10,186,824 B2 * | 1/2019 | Satou | ............... | H01R 4/02 |
| 2003/0226823 A1 * | 12/2003 | Fujimoto | ............... | B23H 11/006 |
| | | | | 219/56.1 |
| 2006/0169742 A1 * | 8/2006 | Fujimoto | ............... | H01R 4/187 |
| | | | | 228/4.5 |
| 2006/0208838 A1 * | 9/2006 | Beuscher | ............... | H01R 4/625 |
| | | | | 335/78 |
| 2011/0062218 A1 * | 3/2011 | Ohnuma | ............... | B23K 20/106 |
| | | | | 228/110.1 |
| 2012/0298645 A1 * | 11/2012 | Kleespiess | ............... | H01R 3/048 |
| | | | | 219/137 R |
| 2013/0293045 A1 * | 11/2013 | Kajita | ............... | H02K 15/0062 |
| | | | | 310/71 |
| 2015/0079456 A1 * | 3/2015 | Pauleser | ............... | H01M 2/206 |
| | | | | 429/160 |
| 2016/0006146 A1 * | 1/2016 | Schreck | ............... | H01R 4/023 |
| | | | | 439/668 |
| 2016/0276792 A1 * | 9/2016 | Koda | ............... | B23K 11/10 |
| 2017/0338612 A1 * | 11/2017 | Higashitani | ............... | B23K 11/0033 |
| 2018/0322982 A1 * | 11/2018 | Satou | ............... | H01R 43/0207 |
| 2018/0322983 A1 * | 11/2018 | Satou | ............... | H01R 43/048 |
| 2018/0358721 A1 * | 12/2018 | Kioschis | ............... | H01B 9/006 |

* cited by examiner

ELECTRICAL HIGH-CURRENT CONNECTOR AND METHOD FOR PRODUCING AN ELECTRICAL HIGH-CURRENT CONNECTOR

CROSS-REFERENCE TO RELATED APPLICATIONS

This application claims the benefit of the filing date under 35 U.S.C. § 119(a)-(d) of German Patent Application No. 102017112947.2, filed on Jun. 13, 2017.

FIELD OF THE INVENTION

The present invention relates to an electrical connector and, more particularly, to a high-current electrical connector.

BACKGROUND

A large number of electrical connectors are known that transmit electric currents and voltages in a medium-current or high-current and/or a medium-voltage or high-voltage range. The connectors need to ensure, temporarily and/or permanently, problem-free transmission of electric power, for example for supplying and/or distributing electrical energy, in warm, possibly hot, contaminated, humid and/or chemically aggressive environments. Different connectors are made to serve the needs of different applications and, consequently, a great number of different connectors are known and used.

High-current connectors, for example, can be installed on an electrical unit, such as on/in an accumulator or a battery, in an inverter, or in a switchgear. High fuel costs and attempts to reduce environmental impacts make electric and hybrid vehicles necessary in the automotive sector. These vehicles handle high electric operating currents and/or voltages, wherein the related components of the electric or hybrid vehicles, including high-current/high-voltage cables (e.g. stranded wire, conductor rail, etc.) and the contacts thereof (e.g. connecting piece, bus bar, etc.), must be designed accordingly.

Japanese Patent 08306417 A ("JP 08306417 A") discloses an electrical high-current connector comprising a flat strand, the two longitudinal end sections of the flat strand have flat end contact sleeves. A comparatively large first passageway in the contact sleeve is larger than a passageway in the flat strand of the respective end. The passageway in the flat strand has substantially a same diameter as a comparatively small second passageway in the contact sleeve. In an application of the high-current connector, a nut, with a washer, is screwed directly onto the flat strand in the region of the first passageway. The end contact sleeve is mounted opposite, for example, on a bolt-shaped battery terminal.

Japanese Patent Application 2008/041330 A ("JP 2008/041330 A") discloses an electrical high-current connector comprising a flat strand, the two longitudinal end sections of the flat strand have flat end contact sleeves. In the end contact sleeve and in the related longitudinal end section of the flat strand, a passageway is established, by which the high-current connector is attached to a bolt-shaped battery terminal. The passageway in the flat strand is reinforced by a cylindrical support collar in order to receive a clamping force on the related end contact sleeve, so that an external surface of the related end contact sleeve does not arch under the resulting voltages.

A high-current electrical connector 10' according to the prior art is shown in FIG. 1 and comprises an electrical stranded wire 100' and a solid electrical connecting piece 200', in particular a solid electrical bus bar 200'. The stranded wire 100' and the connecting piece 200' are initially produced separately from one another. To form the high-current connector 10', the stranded wire 100', for example as a flat strand 100', is braided from individual strands, and the connecting piece 200' is embossed/stamped from a sheet, then finished and prepared for a soldering or welding process. A longitudinal end section 900 of the stranded wire 100' is prepared and compacted. The free longitudinal end of the compacted longitudinal end section 900 of the stranded wire 100' is subsequently prepared for a soldering or welding process, and the connecting piece 200' is soldered or welded 910 onto the compacted longitudinal end section 900 of the stranded wire 100'. This production method is time-consuming and thus costly.

SUMMARY

A high-current electrical connector comprises a stranded wire and a connecting piece. The stranded wire has a longitudinal end section. The longitudinal end section of the stranded wire is incorporated in a material of the connecting piece.

BRIEF DESCRIPTION OF THE DRAWINGS

The invention will now be described by way of example with reference to the accompanying Figures, of which.

DETAILED DESCRIPTION OF THE EMBODIMENTS

Figure 1:
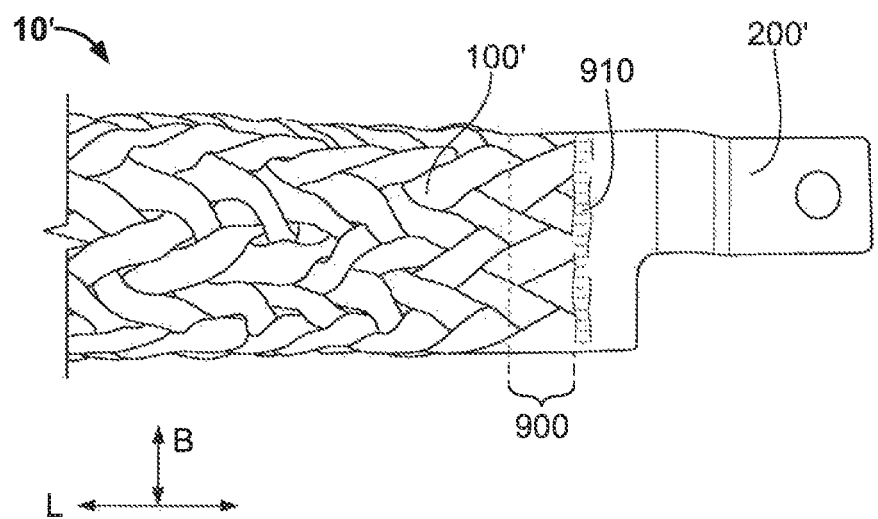
FIG. 1 is a plan view of a high-current electrical connector according to the prior art.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

Figure 2:
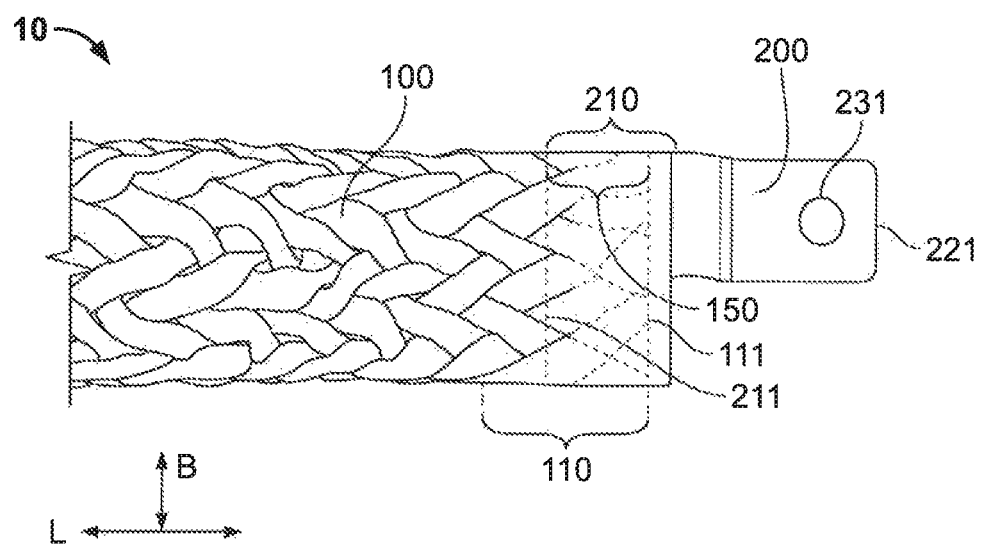
FIG. 2 is a plan view of a high-current electrical connector according to the invention.
Figure 3:
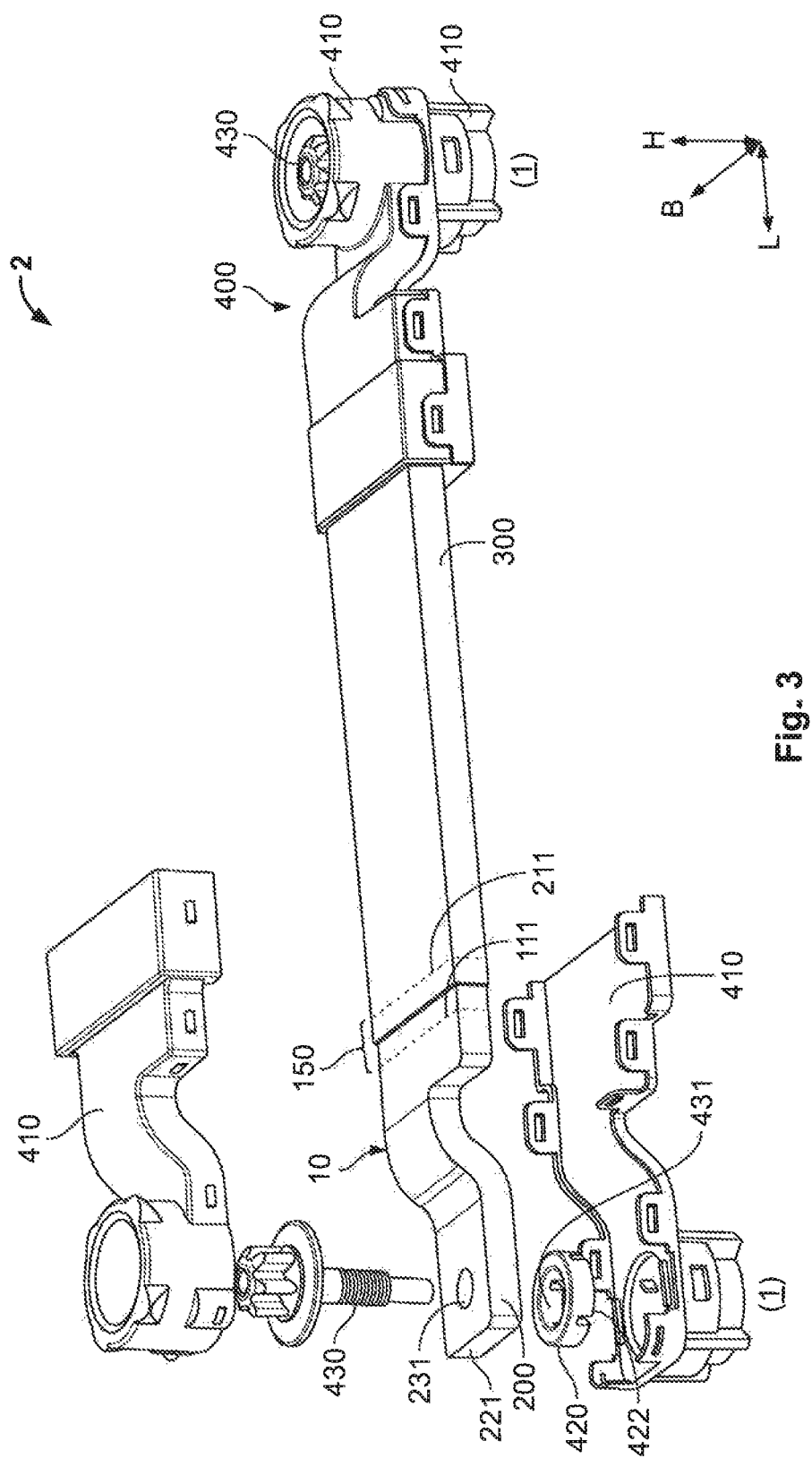
FIG. 3 is an exploded perspective view of a high-current electrical connector assembly including the high-current electrical connector.

A high-current electrical connector 10 according to an embodiment is shown in FIG. 2. Throughout the description, the high-current electrical connector 10 may also be referred to as a strand connector 10. A high-current electrical connector assembly 2 according to an embodiment including the high-current electrical connector 10 is shown in FIG. 3. The high-current electrical connector assembly 2 may be used a cell connector 2 or a module connector 2. In an embodiment, the connector assembly 2 is used in an accumulator 1 or a battery 1 in automotive applications. In other embodiments, the high-current connector assembly 2 can be applied, for example, to an electrical unit 1, an electrical device 1, an electrical module 1, an electrical apparatus 1, an electrical installation 1, an electrical system 1, an inverter 1, a switchgear 1, etc.

The invention will be explained with reference to the drawings using a width direction B or a width axis B, a height direction H or a height axis H, and a longitudinal direction L or a longitudinal axis L of the high-current electrical connector 10 and the high-current electrical connector assembly 2.

The high-current electrical connector 10, as shown in FIG. 2, includes an electrical stranded wire 100 and an electrical connecting piece 200.

In the embodiment shown in FIG. 2, the stranded wire 100 is formed as a flat strand of a braided wire; in other embodiments, a round strand of a braided cable or a stranded wire, or a braided sleeving can likewise be used. In various embodiments, the stranded wire 100 can be formed of a copper material or an aluminum material. In other embodiments, the stranded wire 100 can serve as a casting core for producing the high-current connector 10.

In the embodiment of FIG. 2, the connecting piece 200 is a solid bus bar 200. In other embodiments, the connecting piece 200 can be other forms of contacts.

The stranded wire 100, as shown in FIG. 2, is embedded in or incorporated into the connecting piece 200 by a molding method. In various embodiments, the molding method may be a casting method or a forging method, and may, for example, be a cold forging method. The connecting piece 200, which has not yet been molded and is, for example, a liquid, formless starting material or is in a preformed state, is shaped on the stranded wire 100 as the connecting piece 200. A longitudinal end section 110 of the stranded wire 100 is embedded in or incorporated into the connecting piece 200, or vice versa. In an embodiment, the connecting piece 200 has an external dimension greater than the stranded wire 100; the connecting piece 200 is provided externally on the stranded wire 100.

Molding herein can be understood to mean a molding from a liquid state, such as by casting a molten metal, from a plastic state, such as by hot working or plastically deforming a metal blank, or from a solid state, such as by hot working, semi-hot working, or cold working a metal blank. Molding is thus not only understood to mean a forming in which a solid body with a geometrically defined form is produced out of an amorphous base material, but also includes instanced in which the base material is in a preformed state and brought into the geometrically defined form. In an embodiment, the connecting piece 200 has been or is cast onto the longitudinal end section 110 of the stranded wire 100, or the connecting piece 200 has been or is forged onto the longitudinal end section 110 of the stranded wire 100, in particular cold forged. Forging can be understood to mean a thixoforging, a hot forging (hot working), a semi-hot forging (semi-hot working) or a cold forging (cold working).

As shown in FIG. 2, a transition structure 150 including both the stranded wire 100 and the connecting piece 200 is established between the stranded wire 100 and the connecting piece 200. The transition structure 150 extends in the width direction B, the height direction H, and the longitudinal direction L. In the transition structure 150, structures of the stranded wire 100 alternate with structures of the connecting piece 200; these structures pass through each other and thus enable a solid cohesion of the stranded wire 100 with the connecting piece 200.

In the embodiment shown in FIG. 2, the longitudinal end section 110 of the stranded wire 100 extends into a longitudinal end section 210 of the connecting piece 200. A bonded end 111 of the longitudinal end section 110 of the stranded wire 100 is disposed in the connecting piece 200 and a bonded end 211 of the connecting piece 200 is disposed in the stranded wire 100. The two bonded ends 111, 211 constitute the transition structure 150 inside the high-current connector 10, in which the high-current connector 10 includes the stranded wire 100 and the connecting piece 200. In another embodiment, the longitudinal end section 110 of the stranded wire 100 can extend substantially to a longitudinal end 221 of the connecting piece 200 opposite the bonded end 211 of the connecting piece 200 inside the stranded wire 100.

In the embodiment shown in FIG. 2, the connecting piece 200 has a passageway 231 for further attachment described below. The passageway 231 can be formed during or after molding the connecting piece 200.

The high-current connector 10 has a longitudinal end region in the longitudinal direction L; from the longitudinal end 221 of the connecting piece 200, the longitudinal end region includes the connecting piece 200, the transition structure 150, and the stranded wire 100 shown in FIG. 2.

In an embodiment, the transition structure 150 is embedded in the connecting piece 200 as a kind of core. If the transition structure 150 is formed as a core in the connecting piece 200, at least one dimension of the core or the stranded wire 100 is smaller in a specific section than a corresponding dimension of the connecting piece 200. In other embodiments, at least in sections, all dimensions of the connecting piece 200 substantially correspond to those of the transition structure 150; the longitudinal end section 110 of the stranded wire 100 cast over and together with the casting material then forms the connecting piece 200.

The high-current electrical connector assembly 2 including the high-current electrical connector 10 is shown in FIG. 3. The entire high-current connector 10 is fully encapsulated; in the width direction B, height direction H, and longitudinal direction L neither the stranded wire 100 nor the connecting piece 200 of the high-current connector 10 is accessible from the outside. The high-current connector 10 may, however, be accessible via an electrical contact 410 of the connector assembly 2 and/or by a longitudinal end section of an attachment device 430 as described in greater detail below.

As shown in FIG. 3, the high-current connector 10 is electrically insulated by a jacket 300 in a central region of the high-current connector 10 and by a capsule 400 on each of a pair of longitudinal end regions of the high-current connector 10. In an embodiment, the jacket 300 and the capsules 400 are made from a plastic material. As shown in FIG. 3, the capsules 400 and the jacket 300 overlap.

As shown in FIG. 3, each capsule 400 has two insulating shells 410, 410, which are complementary and can be attached to one another. Inside each insulating shell 410 of each capsule 400, an electrical contact 420 of the connector assembly 2 is received and mounted. The contact 420 is located between the connecting piece 200 and the related insulating shell 410.

A passageway 431 of the contact 420, as shown in FIG. 3, is aligned with the passageway 231 of the connecting piece 200. Each contact 420 has its electrical contact portion 422 exposed at the capsule 400 at an end in the height direction H, for which the insulating shell 410 has a corresponding passageway.

The connector assembly 2 can be electrically connected to a terminal of the accumulator 1 or the battery 1 via the contact unit 422, which is in an electrically conductive connection with the high-current connector 10. The related longitudinal end region of the connector assembly 2 is fixed onto the terminal by an attachment device 430, in particular a screw 430. The electrical contact 420 is brought into an electrically conductive clamping connection with the terminal by the attachment device 430, which extends through the passageway 231 of the connecting piece 200 and the passageway 431 of the contact 420.

According to the invention, the high-current connector 10 can be formed without stamping the connecting piece 200 out of the sheet and finishing and preparing the connecting piece 200 for the soldering or welding process. Further, a costly compacting of the longitudinal end section 110 of the stranded wire 100, a preparation of the longitudinal end of the longitudinal end section 110 of the stranded wire 100 for the soldering or welding process, and the costly soldering or welding process of the connecting piece 200 onto the compacted longitudinal end section 110 of the stranded wire 100 can also be dispensed with. Furthermore, compared to the prior art, the high-current connector 10 has a better electrical transition resistance and can be made smaller.

What is claimed is:

1. An electrical connector assembly for an accumulator or a battery, comprising:
    an electrical connector including a stranded wire having a longitudinal end section and a connecting piece, the longitudinal end section of the stranded wire is incorporated in a material of the connecting piece;
    a jacket electrically insulating a central region of the electrical connector; and
    a capsule electrically insulating a longitudinal end region of the electrical connector, the capsule including a pair of insulating shells attachable to one another.

2. The electrical connector assembly of claim 1, further comprising an electrical contact received in one of the pair of insulating shells, the electrical contact having an electrical contact portion exposed on a side of the insulating shell.

3. The electrical connector assembly of claim 2, wherein the electrical connector is entirely encapsulated in a width direction, a height direction, and a longitudinal direction except for the electrical contact portion.

4. The electrical connector assembly of claim 1, wherein the connecting piece is a solid bus bar.

5. The electrical connector assembly of claim 1, wherein the longitudinal end section of the stranded wire is incorporated in a longitudinal end section of the connecting piece.

6. The electrical connector assembly of claim 1, wherein a transition structure including both the stranded wire and the connecting piece is formed between the stranded wire and the connecting piece.

7. The electrical connector assembly of claim 6, wherein, in the transition structure, the material of the connecting piece is located between a plurality of strands of the stranded wire.

8. The electrical connector assembly of claim 1, wherein the connecting piece extends from the stranded wire along a longitudinal direction of the stranded wire.

9. The electrical connector assembly of claim 1, wherein the connecting piece is molded onto the longitudinal end section of the stranded wire.

10. The electrical connector assembly of claim 1, wherein the stranded wire is formed of a copper material or an aluminum material.

\* \* \* \* \*